United States Patent [19]

Snook

[11] Patent Number: 5,492,391
[45] Date of Patent: Feb. 20, 1996

[54] OVAL SPLINE-DRIVE WHEEL AND ADAPTER

[76] Inventor: Steven J. Snook, 3752 Helena Cir., La Verne, Calif. 91750-3238

[21] Appl. No.: 139,094

[22] Filed: Oct. 21, 1993

[51] Int. Cl.⁶ ................................................. B60B 27/06
[52] U.S. Cl. ................................ 301/35.58; 301/35.63; 301/105.1; 411/437
[58] Field of Search ........................ 301/35.53, 35.56, 301/35.58, 35.55, 35.63, 59, 61, 105.1, 111, 114, 115, 116, 122, 35.62, 35.61; 411/433, 437, 438

[56] References Cited

U.S. PATENT DOCUMENTS

| | | | |
|---|---|---|---|
| D. 157,484 | 2/1950 | Gade | 411/437 X |
| 1,273,320 | 7/1918 | Booth | 301/35.58 |
| 1,314,381 | 8/1919 | Ash | 301/35.58 |
| 1,333,019 | 3/1920 | Graham | 301/59 |
| 1,353,394 | 9/1920 | House, Jr. | 301/59 |
| 1,421,638 | 7/1922 | Wheeler | 411/437 |
| 1,516,664 | 11/1924 | Blank | 301/35.63 X |
| 1,575,322 | 3/1926 | Davison | 301/35.63 X |
| 1,637,248 | 7/1927 | White | 301/35.63 |
| 1,722,783 | 7/1929 | Basseches | 411/437 |
| 1,737,332 | 11/1929 | Pugh et al. | 301/35.58 X |
| 1,813,431 | 7/1931 | Shoemaker | 301/35.63 |
| 1,818,447 | 8/1931 | Baker | 301/35.63 |
| 2,156,002 | 4/1939 | Tinnerman | 411/437 |
| 2,257,237 | 9/1941 | Hecht | 301/35.63 |
| 2,746,804 | 5/1956 | Bourdon | 301/35.63 |
| 2,781,231 | 2/1957 | Black | 301/105.1 |
| 3,425,760 | 2/1969 | Gordon | 301/35.63 X |
| 4,478,458 | 10/1984 | Flexman | 301/35.62 X |
| 4,944,562 | 7/1990 | Garrison | 301/35.58 X |

FOREIGN PATENT DOCUMENTS

| | | | |
|---|---|---|---|
| 201031 | 2/1956 | Australia | 301/35.63 |
| 571180 | 5/1924 | France | 301/35.63 |
| 1047490 | 12/1953 | France | 301/35.63 |

*Primary Examiner*—Russell D. Stormer
*Attorney, Agent, or Firm*—William L. Chapin

[57] ABSTRACT

A vehicle wheel and adapter allowing the wheel to be fastened by means of a single knock-off type hub nut to a disk brake hub or brake drum of a vehicle utilizing wheels of the type that are attached by a plurality of lug bolts or lug nuts includes a circular adapter plate provided with mounting holes to permit the adapter to be attached using existing lug bolts or lug nuts. The adapter plate has an axially forwardly protruding central coaxial tube section externally threaded on an outer axial portion thereof, and a plurality of longitudinally disposed, arcuate transverse section splines protruding radially outwards from an intermediate longitudinal portion of the tube section. A wheel hub having a tubular front section and a larger diameter, dish-shaped rear section has an internally splined intermediate longitudinal portion provided with grooves adapted to longitudinally slidably receive the splines. The tubular front section of the wheel hub has an inwardly and rearwardly tapered, frustoconically shaped entrance opening. A slotted hub nut having a slotted, frusto-conically shaped outer wall is distorted radially outwards when tightened on the threaded tube section of the adapter, thereby exerting radially outwardly directed centering forces on the wheel hub. In the preferred embodiment, both the externally splined section of the adapter and the internally splined section of the wheel hub have in transverse section an approximately sinusoidal shape, to provide stress relief.

33 Claims, 4 Drawing Sheets

OVAL SPLINE-DRIVE WHEEL AND ADAPTER

BACKGROUND OF THE INVENTION

A. Field of the Invention

The present invention relates to wheels used for automobiles, motorcycles, and other such vehicles. More particularly, the invention relates to an improved wheel of the knock-off hub type, and an adapter that permits ready installation of the wheel on vehicles originally equipped with brake drums or disks utilizing a plurality of bolts or nuts to attach the wheels to the vehicle.

B. Description of Background Art

A variety of different designs have been employed for detachable wheels used on automobiles, trucks, motorcycles and similar powered vehicles.

For example, Ash, U.S. Pat. No. 1,213,976, Aug. 26, 1919 discloses a Detachable Wheel For Automobiles that employs a plurality of radially and axially symmetric, axially projecting circular cross-section lugs to engage through-holes provided in the inner base flange of a demountable wire wheel.

Webster, U.S. Pat. No. 1,345,648, Jul. 6, 1920 discloses a Wheel Hub for detachable wheels that uses a plurality of radially and axially symmetric, radial sector-shaped lugs to engage radial slots in a demountable wheel.

Gordon, U.S. Pat. No. 3,425,670, Feb. 4, 1969 discloses a Wheel Assembly which uses tapered lugs on a frusto-conic flaring unit attached to an axle to engage the beveled inner surface of a wheel hub.

Other U.S. Patents relating to the attachment of a wheel to the driving hubs of a vehicle include:

Sager, U.S. Pat. No. 4,029,423, Jun. 14, 1977, Free-Wheeling Spindle Adaptor: Discloses an adaptor capable of being mounted to the drive hubs of a vehicle to allow the vehicle to roll freely without rotation of the drive hubs or drive train. The adaptor includes an adaptor spindle which can be directly mounted to the drive hub using the wheel studs. A free-wheeling hub is mounted onto the adaptor spindle and includes a stud flange and studs providing an identical attachment pattern to that of the drive hub. The wheel of the vehicle may therefore be mounted on the free-wheeling hub such that the vehicle may be towed without injury to the drive line.

Hayashi, U.S. Pat. No. 4,537,449, Aug. 27, 1985, Vehicle Wheel Attaching Device: Discloses a vehicle wheel attaching device for removably attaching general-road traveling wheels to the hubs of a vehicle by utilizing an independent adapter in a manner enabling transmission of torque. The adapter is made approximately in the form of a top hat and is bent at its top to form a dish spring surface for contact with the head of a center bolt which extends outward through a central hole in the adapter. A center nut is attached to the projecting outer end of the bolt, the nut being tightened to permit elastic action of the top surface of the adapter, thereby fixing the wheel in position in a non-rigid condition.

Garrison, U.S. Pat. No. 4,944,562, Jul. 31, 1990, Wire Wheel Hub Adapter Apparatus: Discloses an adapter that allows installation of knock-off type wire wheels onto a studded brake drum. The adapter permits a wire wheel formed with an internally splined hub to be secured to the axle of the adapter. The adapter includes a central flange formed with a hollow axially aligned support hub formed with gradually increasing wall thickness to effect enhanced strength of the hub and ensure alignment of an associated extending axle. The extending axle includes an externally splined shaft located inward from the outer end of the axle, for receiving the associated wire wheel at an outwardly distal end, and an externally threaded outward portion for receiving the locking hub.

In addition to the wire wheel adapter apparatus disclosed in Garrison, hub-centric, positive engagement wheel/adapter combinations known to the present inventor comprise two main types. One type employs complementary radially disposed teeth and grooves in the outer circular face of an adapter and the inner circular face of a wheel hub, respectively. A second type of wheel/adapter combination uses longitudinally disposed splines on the outer cylindrical surface of an adapter tube, and complementary longitudinally disposed splines on the inner cylindrical surface of the hub tube.

The present invention was conceived of to provide an improved adapter and wheel combination that allows wheels of the knock-off hub type to be installed on the disk hub or brake drum of the type used on most vehicles, in which a plurality of lug nuts or bolts hold the wheel by the hub or drum.

Objects of the Invention

An object of the present invention is to provide a spline-drive adapter attachable to the disk hub or brake drum of a vehicle that normally utilizes a plurality of lug nuts or lug bolts to fasten original equipment wheels to the vehicle, and a replacement wheel having a hub with internal longitudinally disposed grooves engageable by splines of the adapter, the replacement wheel and adapter including means permitting quick attachment to and detachment from one another.

Another object of the invention is to provide a hub-centric knock-off hub wheel and spline-drive adapter in which the adapter may be semi-permanently fastened to a disk hub or brake drum of a vehicle using existing lug bolts or lug nuts, and the wheel quickly installed and removed from the vehicle.

Another object of the invention is to provide a hub-centric knock-off wheel and spline-drive adapter on which the wheel and adapter are positively locked in rotational engagement with respect to one another.

Another object of the invention is to provide a drive adapter fastenable to a brake drum or disk brake hub which has circumferentially spaced apart, longitudinally disposed splines adapted to fit into grooves in a replacement wheel hub, the splines having an oval cross section.

Another object of the invention is to provide a replacement wheel on which the hub of the wheel has internal longitudinally disposed grooves adapted to insertably receive external splines of an adapter, the grooves having oval cross sections.

Another object of the invention is to provide a knock-off wheel and spline-drive adapter design that is useable with disk hubs and drums having differing numbers of lug holes, lug nuts, and hole patterns.

Another object of the invention is to provide a positive engagement, spline-drive adapter and knock-off hub combination in which inward axial motion of the hub relative to the adapter is positively limited.

Another object of the invention is to provide a knock-off centers the wheel hub relative to the adapter.

Another object of the invention is to provide a knock-off hub and spline-drive adapter in which the hub nut is so constructed as to permit easy attachment and removal of a decorative spinner over the outer hub nut.

Another object of the invention is to provide a hub for spoked wheels in which spoke seats are so constructed as to minimize radial tensile stresses on the hub, decreasing the likelihood of damage to the hub.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

Summary of the Invention

Briefly stated, the present invention comprehends an improved replacement wheel and wheel drive adapter for vehicles. According to the present invention, the adapter is fastenable to a disk brake hub or brake drum in place of the wheels originally attached to the vehicle, using existing lug bolts or lug nuts. Thus, the adapter includes a circular base plate having through its thickness dimension a plurality of holes lying on a circle and adapted to align with holes or studs of a disk brake hub or brake drum. A longitudinally disposed central coaxial tube protrudes perpendicularly outwards from the base plate. A plurality of uniform thickness strengthening bars is formed integrally with the lower portion of the tube, the bars being disposed axially outwards from the tube at circumferentially spaced apart locations between bolt holes in the base plate. An intermediate longitudinal portion of the tube has formed in the outer cylindrical wall surface thereof a plurality of longitudinally disposed splines. The splines have a semi-oval concave regions to form an approximately sinusoidal contour.

A wheel for use with the adapter has a stepped diameter hub, the larger diameter of an inner longitudinal portion of the hub having a rear coaxial mounting bore terminating in an inner cylindrical wall provided with a plurality of radially inwardly protruding, sinusoidally-shaped, longitudinally disposed internal splines alternating with complementarily shaped, longitudinally disposed grooves that are adapted to longitudinally slidably receive the external splines of the adapter tube.

The hub is secured to the adapter by means of a cup-shaped hub nut having internal helical threads adapted to engage external helical threads provided in the outer cylindrical surface of the longitudinally disposed outermost portion of the tube, which has a smaller diameter than the splined portion of the tube. The hub nut has a radially inwardly tapered annular shoulder surrounding the internal threads that is adapted to bear against the inner circumferential wall of the smaller diameter outer tubular section of the wheel hub, thus centering the hub relative to the adapter.

In the preferred embodiment, the hub nut has external hexagonal faces adapted to be driven by an adapter socket provided with the wheel and adapter, the adapter socket having a smaller diameter, hexagonally faced boss adapted to be engaged by a smaller socket and wrench.

Also in the preferred embodiment, a continuous annular groove is formed in the external hexagonal faces of the hub nut. The annular groove is adapted to receive radially inwardly projecting set screws extending through the annular wall of a decorative spinner attachable over the hub nut, thereby securing the spinner to the hub nut. In an embodiment of the wheel utilizing spokes, spoke holes through both axial sections of the hub are provided with ball-shaped inner sockets for seating the ends of the spokes, the ball shape distributing tensional spoke forces more uniformly on the hub, thereby minimizing the likelihood of hub breakage.

DETAILED DESCRIPTION OF THE INVENTION

Referring now to FIGS. 1–12, a novel oval spline-drive wheel and adapter according to the present invention is shown. The spline-drive wheel and adapter according to the present invention are intended primarily for use as an accessory or after-market item that permits attachment of a knock-off type wheel to the brake drum or disk hub of a vehicle originally equipped with wheels attached by a plurality of lug nuts or lug bolts to the drum or disk hub.

Figures 1, 2, 3, 4, 5:
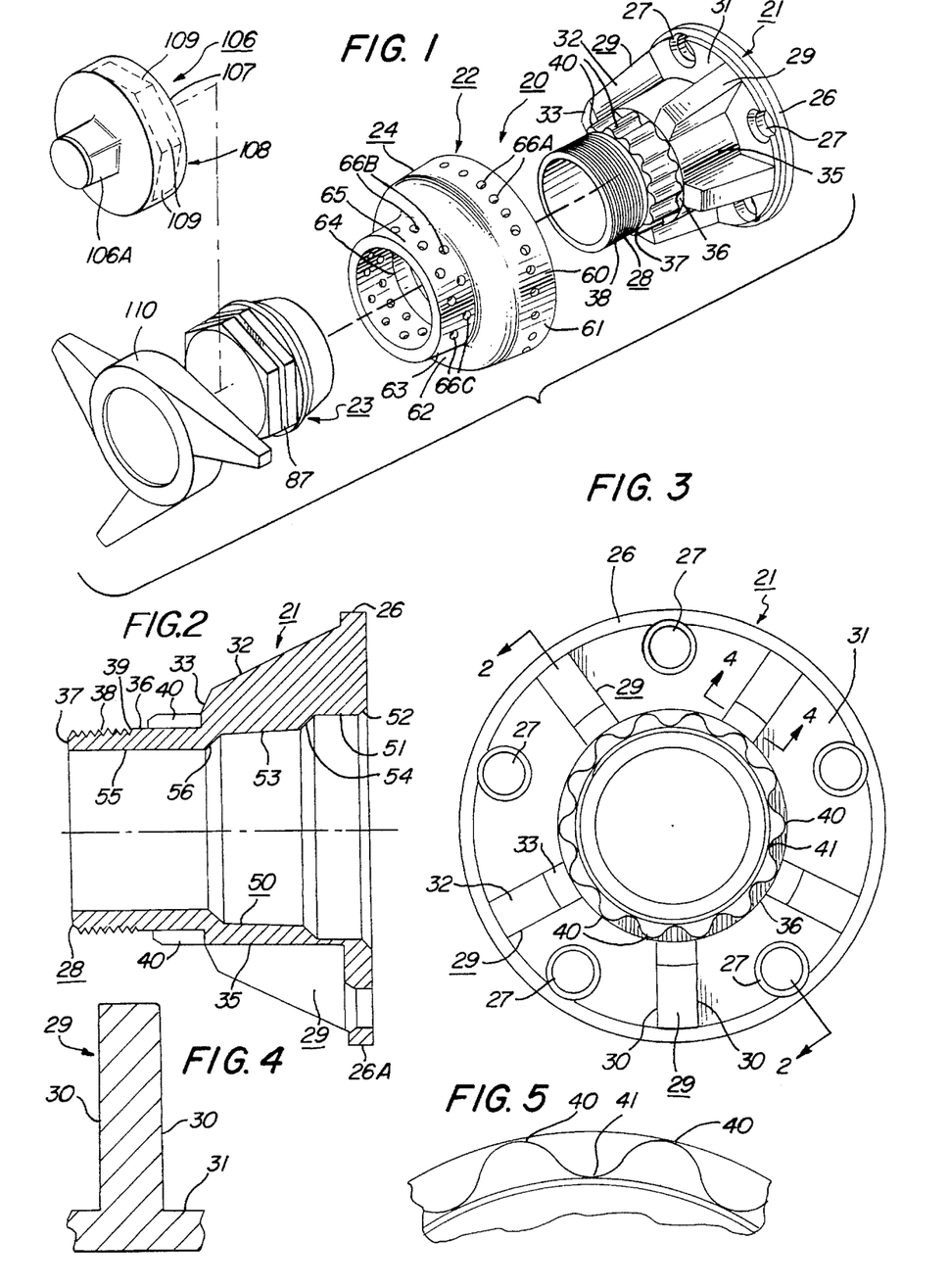
FIG. 1 is an exploded perspective view of an oval spline-drive wheel hub and adapter according to the present invention.
FIG. 2 is a longitudinal sectional view of an adapter comprising part of the structure shown in FIG. 1, taken along line 2—2.
FIG. 3 is an outer elevation view of the adapter of FIG. 2.
FIG. 4 is a fragmentary sectional view of the adapter of FIG. 3, taken along line 4—4 of FIG. 3.
FIG. 5 is a fragmentary transverse sectional view of the adapter of FIG. 3 on a somewhat enlarged scale.

As shown in FIG. 1, the oval spline-drive wheel and adapter 20 according to the present invention includes an adapter 21, a wheel 22, and a hub nut 23. In FIG. 1, wheel 22 is shown fragmentarily, with only hub 24 of the wheel shown completely. As will become clear from the ensuing description, wheel 22 may be of the spoked variety, in which hub 24 is joined to a peripheral rim by spokes. Alteratively, wheel 22 may be of the type in which metal webs join hub 24 to front and rear peripheral flanges, similar to the construction of conventional original-equipment wheels. However, since wheel 22 is generally intended to be an upgraded replacement for original-equipment wheels, the webbed version would usually be of a cast magnesium or aluminum construction, rather than the pressed steel construction typically used for original-equipment wheels.

As shown in FIGS. 1–6, oval spline-drive adapter 21 includes a circular base plate 26. Base plate 26 has through its thickness dimension a plurality of longitudinally disposed, circumferentially spaced apart holes 27. Holes 27 lie on a circle concentric with base plate 26, and are of the proper size and locations to receive studs projecting from a disk brake disk hub or brake drum of the type and size which the adapter is intended to fit.

As shown in FIG. 1, adapter 21 has a central longitudinally disposed coaxial tube section 28 that protrudes perpendicularly outwards from base plate 26. A plurality of rectangular cross-section strengthening bars 29 that are disposed radially outwards from central coaxial tube section 28 protrudes perpendicularly outwards from circular base plate 26. As may be seen best by referring to FIGS. 3 and 4, each strengthening bar 29 has a pair of longitudinally disposed side walls 30 protruding outwards from outer flat annular surface 31 of base plate 26 of adapter 21. As may be seen best by referring to FIG. 2, each strengthening bar 29 preferably has a long flat outer edge wall 32 angled inwards from base plate 26 towards tube section 28 of adapter 21, and a short upper flat edge wall 33 angled inwards towards the tube section from edge wall 32.

As shown in FIGS. 1 and 2, tube section 28 of adapter 21 has a stepped outer diameter. Thus, tube section 28 has a relatively large diameter base section 35 having a length coextensive with that of strengthening bars 29, an intermediate longitudinal section 36 of smaller diameter than that of the base section, and an upper or longitudinally outermost cylindrical section 37 of smaller diameter than the intermediate section. Helical threads 38 are formed in the outer wall surface 39 of outer longitudinal section 37 of tube section 28.

As may be seen best by referring to FIGS. 1, 3 and 5, intermediate longitudinal section 36 of tube section 28 of adapter 21 has formed in the outer cylindrical wall surface thereof a plurality of longitudinally disposed splines 40. Splines 40 have a convex arcuate, semi-oval cross-sectional shape, and alternate with semi-oval concave regions 41 to form an approximately sinusoidal contour.

As shown in FIG. 2, the inner diameter of central coaxial tube section 28 is also axially stepped. Thus, the inner cylindrical wall surface 50 of tube section 28 has a large diameter base section 51 having a chamfered opening 52, an intermediate cylindrically stepped longitudinal section 53 of smaller diameter than base section 51 and having a chamfered transition surface 54 with base section 51, and a cylindrically shaped outer longitudinal section 55 of smaller diameter than intermediate section 53 and having an annular transition section 56 with intermediate section 53. With tube section 28 formed with stepped inner and outer diameters as described above, a minimum wall thickness is maintained in the tube section to maintain required strength, without making adapter 21 too heavy. Preferably, adapter 21 is made as a steel casting which is finish machined. The purpose of chamfered entrances 52 and 54 is to allow adapter 21 to slide over the wheel bearing of a wheel with minimum chance of catching the bearing. The purpose of transition section 56 is to provide clearance for the end wall of a wheel bearing.

Figure 6:
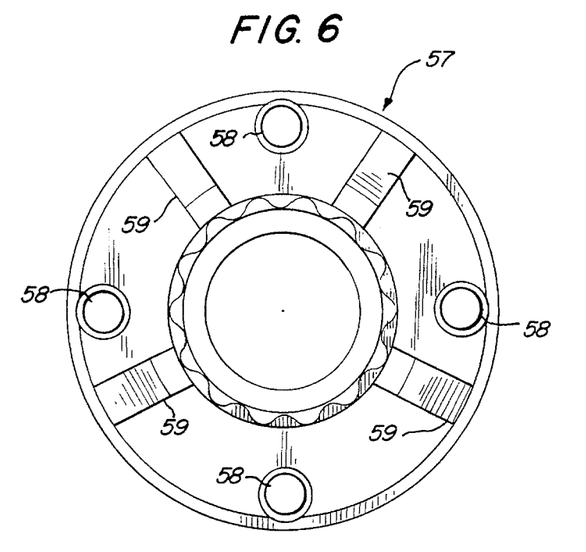
FIG. 6 is an outer elevation view of a modification of the adapter of FIG. 2.

As may be seen best by referring to FIGS. 1 and 3, each bolt hole 27 through base plate 26 of adapter 21 is located on a common circle concentric with tube section 28 of the adapter, and is circumferentially located between a pair of strengthening bars 29. The adapter 21 shown in FIG. 3 is intended for use with brake drums or disk brake hubs utilizing five lug bolts or lug nuts, and has five bolt holes 27 and five strengthening bars 29. Of course, adapter 21 can be constructed to be useable with brake drums or disk brake hubs having differing numbers of bolts or studs. Thus, for example, FIG. 6 shows an adapter 57 having four bolt holes 58 and four strengthening bars 59.

Referring now to FIG. 1 and FIGS. 7–9, oval spline-drive wheel and adapter assembly 20 according to the present invention may be seen to include a wheel hub 24 adapted to lockably fit onto adapter 21.

Figure 8:
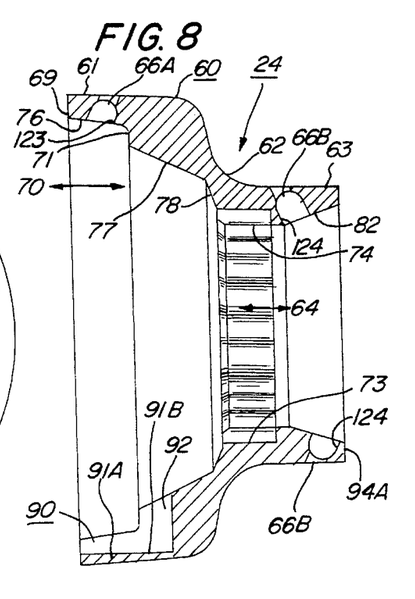
FIG. 8 is a longitudinal sectional view of the wheel hub of FIG. 7, taken along line 8—8 of FIG. 7.

As shown in FIGS. 1 and 8, wheel hub 24 has a concave dish-shaped base section 60 having a cylindrically-shaped flange wall 61 and a front transversely disposed tapered annular wall 62. A tubular section 63 coaxial with base section 60 protrudes longitudinally outwards from front tapered annular wall 62 of the base section. Tubular section 63 has a generally cylindrical shape, a bore 64 extending longitudinally through both the tubular section and base section 60. As shown in FIG. 1, cylindrical wall 65 of tubular section 63 and cylindrical flange wall 61 of base section 60 is provided with a plurality of through-holes 66. Thus, as shown in FIG. 1, a first set of rear through-holes 66A spaced apart at regular circumferential intervals lies on a circle on cylindrical flange wall 61 of base section 60. A second, set of intermediate through-holes 66B spaced apart at regular circumferential intervals lies on a circle on the rear portion of tubular section 63 of wheel hub 34. And a third set of front through-holes 66C spaced apart at regular circumferential intervals lies on a circle on the front portion of tubular section 63. Holes 66 are adapted to receive spokes that secure the hub of wheel 22 to a tire-supporting rim. As will become apparent from the ensuing description of the structure and function of wheel hub 34, the hub could be joined to the rim of a cast wheel by an integral annular web, rather than spokes.

Figure 7:
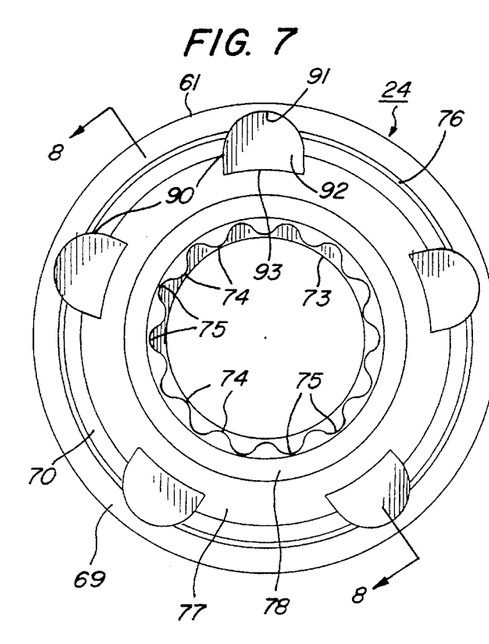
FIG. 7 is an inner elevation view of a wheel hub comprising part of the structure shown in FIG. 1.

Referring now to FIGS. 7 and 8, wheel hub 24 may be seen to have a rear wall 69 provided with a circular opening or counterbore 70 terminating in a flat inner annular wall 71 encircling smaller diameter bore 64 extending through the hub. As may be seen best by referring to FIG. 8, wheel hub 24 has a stepped inner diameter. Thus, wheel hub 24 has a rear opening or counterbore 70 of relatively large diameter, the counterbore having inwardly tapered circumferential side walls 76, of the proper diameter and shape to provide clearance for the outer cylindrical surface 26A of circular base plate 26 of adapter 21. Longitudinally forward from rear counterbore 70, wheel hub 24 has a relatively long inwardly tapered circumferential wall 77, and a shorter, more steeply tapered annular wall 78 at the forward end of annular wall 77. Tapered annular walls 77 and 78 are adapted to provide clearance for edge walls 32 and 33, respectively, of strengthening bars 29.

As may be seen best by referring to FIGS. 7 and 8, hub 24 has an inner cylindrical wall section 73 longitudinally forward of short tapered annular wall section 78. As may be seen best by referring to FIG. 7, inner cylindrical wall section 73 has formed therein internal sinusordally-shaped longitudinally disposed splines 74. Splines 74 have a convex, arcuate, semi-oval cross-sectional shape, and alternate with semi-oval concave regions 75 to form an approximately sinusoidal contour. Thus formed, splined inner cylindrical wall surface 73 of wheel hub 34 is adapted to insertably receive splines 40 of adapter 21. Forward of front internally splined section 73 of wheel hub 24 is a frusto-conically tapered front annular entrance wall 82 that has an outer, entrance diameter larger than bore 64 of outer tubular section 63.

As may be seen best by referring to FIG. 7, the inner surface of concave dish-shaped section 60 of wheel hub 24 has formed therein a plurality of circumferentially spaced apart cutouts 90 adapted to provide clearance for lug bolt heads or lug nuts used to attach adapter 21 to a brake drum or disk brake hub. As shown in FIGS. 7 and 8, each cutout 90 includes a longitudinally disposed, arcuately curved groove section 91 formed in tapered circumferential side wall 76. Cutout 90 also includes a longitudinally disposed groove 92 cut forward into tapered inner circumferential wall 77 of dish-shaped section 60. Groove 92 has an arcuately curved outer wall 91B that is continuous with an outer arcuately curved wall 91A of groove 91, and a chordal inner wall 93.

Figure 9:
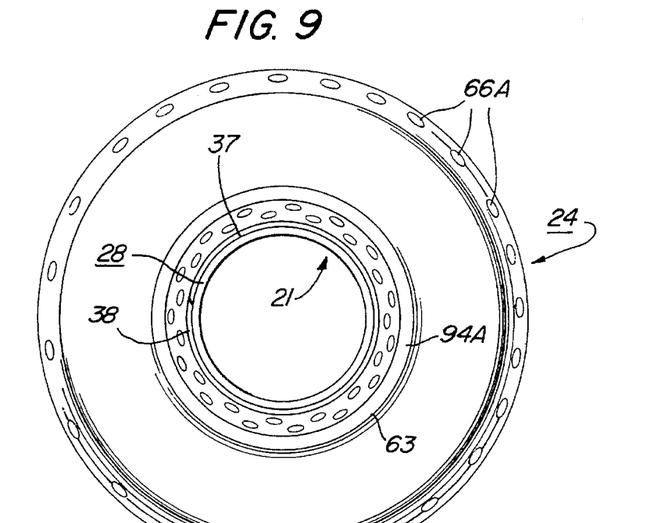
FIG. 9 is an outer elevation view of the wheel hub of FIG. 7, showing the hub installed on the adapter of FIG. 2.

FIG. 9 illustrates the location of threaded outer longitudinal section 37 of central tube section 28 of adapter 21 relative to frusto-conically tapered front opening 82 of wheel hub 24, with the wheel hub slid axially over the adapter sufficiently far for rear annular wall 69 of the hub to seat against outer annular wall surface 31 of the adapter. With internally splined wall surface 73 of wheel hub 24 engaged by external splines 40 of adapter 21, the wheel hub and adapter are secured longitudinally with respect to one another by means of the hub nut 23, as shown in FIG. 1. The structure and function of hub nut 23 may be best understood by referring to FIGS. 10–12.

Figure 10:
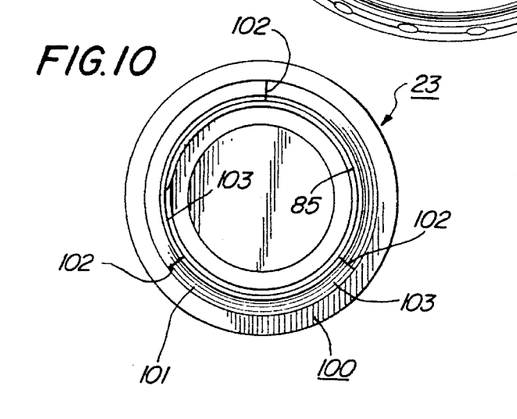
FIG. 10 is an inner elevation view of a hub nut comprising part of the structure shown in FIG. 1.
Figure 11:
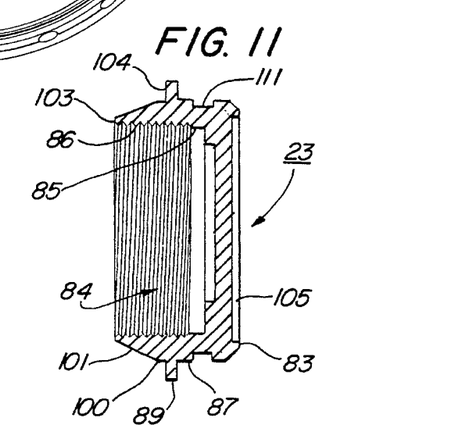
FIG. 11 is a longitudinal sectional view of the hub nut of FIG. 10.
Figure 12:
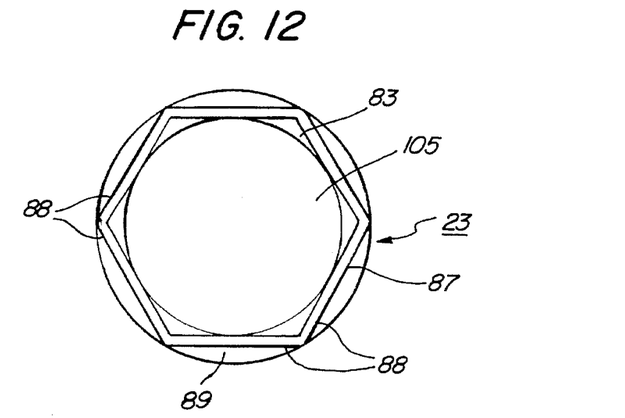
FIG. 12 is an outer elevation view of the hub nut of FIG. 11.

As shown in FIGS. 10–12, hub nut 23 is generally cup-shaped, having a flat front transverse wall 83, and a concave rearward facing opening 84 encircled by an annular rear wall 103. As may be seen best by referring to FIGS. 10 and 11, hub nut 23 has an inner cylindrical wall surface 85 adjacent rear opening 84, in which is formed internal helical threads 86 that are adapted to engage external helical threads 38 on longitudinally outermost section 37 of central coaxial tube section 28 of adapter 21.

As may be seen best by referring to FIG. 12, hub nut 23 has a front section 87 having in the outer wall surface thereof external axially disposed hexagonal faces 88 adapted to be engaged by a wrench. As shown in FIG. 11, the axial length of front section 87 of hub nut 23 is slightly less than half of the overall length of the hub nut, although this length relationship is not critical.

As shown in FIGS. 11 and 12, hub nut 23 preferably has an annular ring section 89 located immediately rearward of front section 87, the ring section 89 having an outer diameter slightly larger than a circle circumscribing the hexagonal walls 88 of the front section.

As may be seen best by referring to FIGS. 10 and 11, hub nut 23 has a rear section 100 having a frusto-conically shaped outer wall surface 101 that tapers from a front diameter smaller than ring-shaped section 89, to a still smaller rear diameter. Frusto-conically shaped outer wall 101 of rear section 100 of hub nut 23 is of the proper size and shape to bear against the frusto-conically tapered front inner opening 82 of wheel hub 24, when the hub nut is screwed down onto threaded outer section 38 of central tube section 28 of adapter 21.

As shown in FIG. 11, rear section 100 of hub nut 23 preferably has a plurality of thin axially disposed slots 102 cut axially forward from rear annular wall 103. Slots 102 are spaced apart at 120-degree circumferential angles. The function of slots 102 is to permit slight radial outward movement of outer wall 101 of rear section 100 when hub nut 23 is screwed down on threaded section 38 of adapter 21. Radial outward movement of outer wall 101 causes it to bear against tapered inner wall 82 of wheel hub 24, thus facilitating centering the hub with respect to the adapter.

Preferably, frusto-conically shaped outer wall 101 of hub nut 23 has an outer surface that resists galling when the hub nut is screwed onto tube section 28 of adapter 21, which action causes both radial and tangential frictional forces to be exerted on outer wall 101 by adjacent inner tapered wall 82 of the tube section. In the preferred embodiment, therefore, hub nut 23 is fabricated from aluminum, with the outer wall 101 being hard anodized to resist galling.

Preferably, center ring-shaped section 89 of hub nut 23 has an outer diameter of approximately the same size as the outer diameter of front tubular section 37 of wheel hub 24. With this arrangement, screwing hub nut 23 down onto tube section 37 of adapter 21 locates the rear annular wall 104 of ring-shaped section 89 in a protective overlying relationship to outer annular wall 94A of wheel hub 24. As shown in FIG. 12, a decorative circular spot face 105 may be formed in front transverse wall 83 of hub nut 23.

Typical applications for the bar drive wheel and adapter according to the present invention include replacements for automobile and truck wheels having rim diameters over the approximate range of 13 inches to 17 inches. For wheels in this size range, hub nut 23 would typically have about a 3 3/16 inch span between the outer wall surfaces of a pair of diametrically opposed hexagonal walls 88. Since this size hub nut would require a wrench larger than typically found in tool kits, the bar drive wheel and adapter according to the present invention preferably includes an adapter socket 106, as shown in FIG. 1. Adapter socket 106 has a concave cup-shaped base section 107 with a hexagonal-shaped opening 108 having hexagonally arranged flat inner walls 109. Opening 108 and flat inner walls 109 are of the proper size and shape to insertably receive front section 87 of hub nut 23. Adapter socket 106 includes a hexagonal cross-section boss 106A that protrudes forward from base section 107 of the adapter socket. Boss 106A is of the proper size and shape to be driven by a standard wrench socket, having a diameter, for example of about one inch.

As shown in FIG. 1, the oval spline-drive wheel and adapter according to the present invention may include a decorative spinner 110 that fits over hub nut 23. The structure that facilitates attachment of spinner 110 to hub nut 23 may be best understood by referring to FIGS. 11 and 13.

As shown in FIG. 11, a continuous annular groove 111 may be formed in the hexagonal walls 88 of front axial section 87 of hub nut 23. Groove 111 is located between front transverse wall 83 and ring-shaped section 89 of hub nut 23. The function of groove 111 is to receive set screws threaded into spinner 110, as will now be described.

Figures 13, 14, 15:
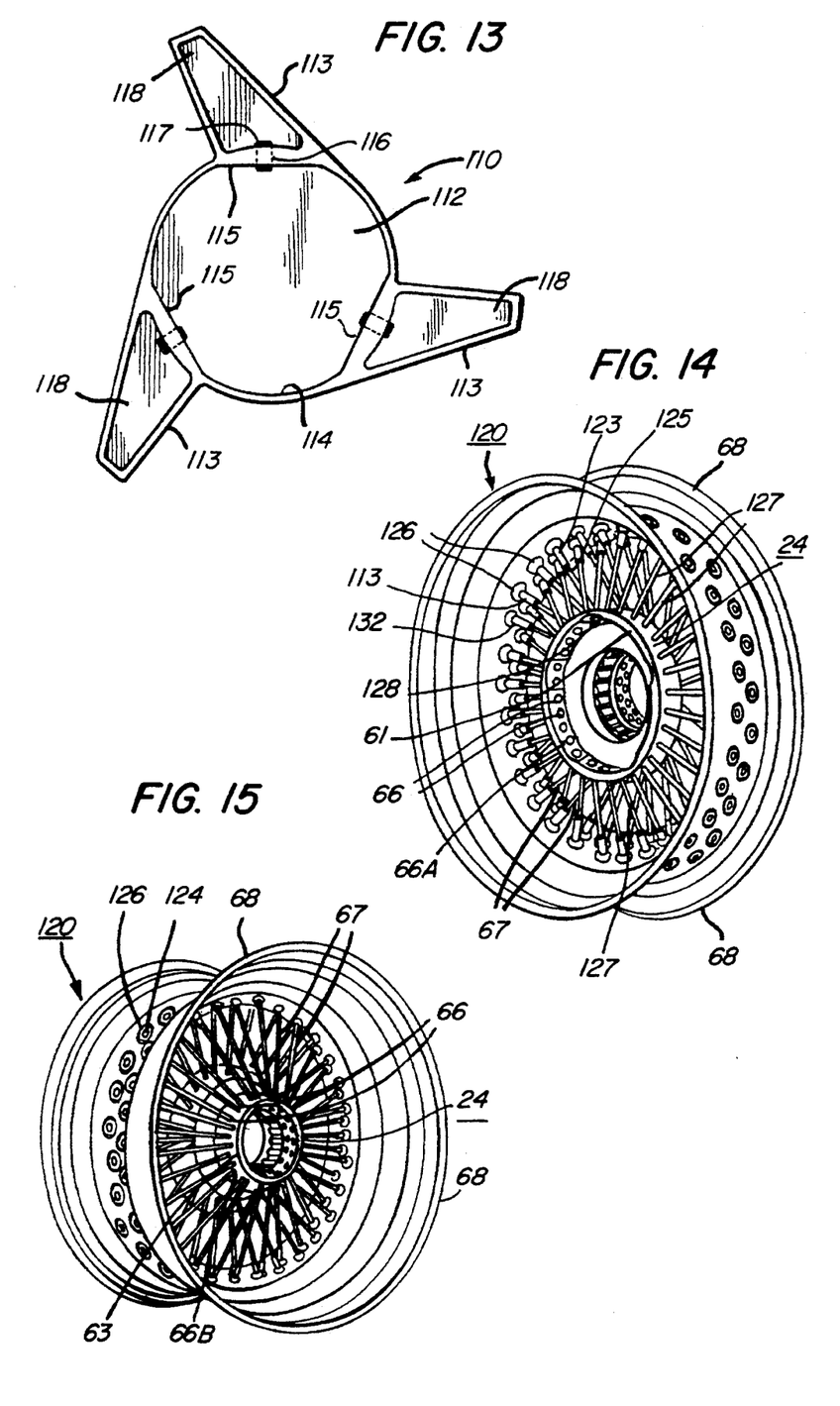
FIG. 13 is an inner elevation view of an optional spinner comprising part of the apparatus of FIG. 1.
FIG. 14 is an inner perspective view of the hub shown in FIG. 1, showing the hub attached to a wheel rim by spokes to comprise a complete spoked wheel.
FIG. 15 is an outer perspective view of the wheel of FIG. 14.

Referring now to FIG. 13, spinner 110 may be seen to have a rearwardly concave central hub section 112. A plurality of arms 113 each having a concave rear surface protrudes outwards from hub section 112. The inner axially disposed wall 114 of central hub section is modified from a cylindrical shape by three flat chordal walls 115 circumferentially spaced apart at 120 degree increments. The spacing and location of chordal walls 115 are adapted to receive hexagonally faced front axial section 87 of hub nut 23, one chordal wall being adjacent every other hexagonal face wall 88. Each of the chordal walls 115 has through its center a threaded hole 116 adapted to receive a set screw 117 that protrudes radially outwards into the concave opening 118 in the rear of an arm 113. Thus positioned, set screws 117 may advance through holes 116 into annular groove 111 of hub nut 23, securing spinner 110 to the hub nut.

As was pointed out previously, the novel construction of the oval spline-drive wheel and adapter according to the present invention may utilize a hub 24 having those novel construction features that permit engagement of the hub by the adapter 21, but cast integrally with a rim and web, and without the spoke holes shown in the figures.

FIGS. 7, 8, 9, 14 and 15 illustrate a novel spoke wheel construction according to the present invention.

Referring now to FIGS. 14 and 15, a spoke wheel or "wire wheel" 120 as it is commonly referred to may be seen to include a central wheel hub 24 attached to an outer coaxial tire rim 68 by a plurality of elongated spokes 67. Each spoke 67 includes an elongated outer rod 123 that has a ball-shaped enlargement 124 on an outer end thereof. Outer rod 123 has a threaded inner end 125. As shown in FIG. 14, outer rod 123 of each spoke 67 is inserted into a hole 126 provided through rim 68, and pushed radially inwards towards wheel hub 24.

Each spoke 67 also includes an elongated inner rod 127 that has a ball-shaped enlargement 128 on an inner end thereof. Inner rod 125 also has a threaded outer end 129. As shown in FIG. 14, inner rod 127 of each spoke 122 is inserted into a hole 66A provided through flange wall 61 of wheel hub 24, or through a hole 66B provided through front tubular section 63 of the wheel hub. Thus positioned, threaded inner end 125 of outer spoke rod 123 and threaded inner end 129 of inner spoke rod 127 are threaded into opposite internally threaded openings of a turnbuckle 132 which is then turned to draw the spoke rods towards one another.

As may be seen best by referring to FIG. 8, each spoke hole 66A through rear flange wall 61 of wheel hub 24 is counterbored in inner cylindrical wall 76. In contrast to prior art spoke wheel construction, counterbore 133 for each spoke hole 66A is arcuately contoured, rather than beveled. Arcuately contoured counterbore surface 133 forms a cup-shaped seat for ball-shaped enlargement 128 at the inner end of inner spoke rod 127. The cup-shaped seat distributes tensile stress, exerted by the ball-shaped end of the spoke rod when turnbuckle 132 is tightened, over a larger area than would be encountered with a beveled seat. Thus, the novel cup-shaped design of the spoke seats in the wheel hub according to the present invention result in a construction that has proved to be substantially more resistant to tensile cracking or breakage than prior wheel hubs using beveled spoke seats. It has also been found that inclining the axis of hole 66A at an angle of about 12 degrees ±one degree to a normal to the outer surface of flange wall 61, which is inclined at an angle of about 6 degrees±one degree to the longitudinal axis of the spoke hub, results in greater resistance to tensile fracture than prior art wheel hubs, which typically employ a bore inclination angle of about 35 degrees.

For the reasons stated above, each spoke hole 66B and 66C through front tubular section 63 of wheel hub 24 also has an arcuately-shaped counterbore 134. Also, the axes of each hole 66B and 66C is preferably inclined at an angle of 30 degrees±one degree, and 32 degrees±one degree respectively, which inclination angles provide greater fracture resistance than prior art construction where typically these inclination angles are about 20 degrees. As shown in FIGS. 14 and 15, each spoke hole 126 through wheel rim 68 is also preferably arcuately counterbored.

What is claimed is:

1. A one piece adapter providing the capability for installing wheels of the type having knock-off hubs on a disk brake hub or brake of a vehicle utilizing wheels attached by means of lug bolts or lug nuts, said adapter comprising;
   a. a base plate having through its thickness dimension a plurality of mounting holes adapted to register with lug blot holes or studs of a disk brake hub or brake drum,
   b. an elongated hollow tube protruding perpendicularly outwards from said base plate, said tube having a bore extending through said base plate and having an inner or rear opening of sufficient size to fit over the wheel bearing cap of said risk brake hub or brake drum, said tube having on the exterior surface of an outer longitudinal portion thereof helical threads adapted to be engaged by an internally threaded hub nut, and
   c. a plurality of longitudinally disposed external splines protruding radially outwards from an externally splined intermediate section of said tube located between said base plate and said outer longitudinal portion of said tube, said external splines having a transverse section a convex arcuate shape and being adapted to be longitudinally slidably received into registered, complementarily shaped grooves formed in an internally splined surface in the inner longitudinal wall surface of a wheel hub.

2. The adapter of claim 1 wherein said external splines of said intermediate tube section are further defined as being parallel to the longitudinal axis of said tube.

3. The adapter of claim 2 wherein said externally splined intermediate tube section is further defined as including longitudinally disposed grooves alternating with said external splines.

4. The adapter of claim 3 wherein said grooves are further defined as having in transverse section a concave arcuate shape.

5. The adapter of claim 4 wherein the external surface of said externally splined intermediate section is further defined has having in transverse section a generally sinusoidal shape.

6. The adapter of claim 1 wherein said base plate is further defined as having a circular plan-view shape.

7. The adapter of claim 6 wherein said hollow tube is further defined as being coaxial with said base plate.

8. The adapter of claim 7 further including a plurality of circumferentially spaced apart longitudinally disposed strengthening bars protruding perpendicularly outwards from said base plate.

9. The adapter of claim 8 wherein said strengthening bars are circumferentially spaced apart from said mounting holes through said base plate.

10. The adapter of claim 9 wherein the circumferential spacing of said strengthening bars is rotationally non-periodic for axial rotations of less than 360 degrees.

11. The adapter of claim 8 wherein said strengthening bars are of lesser axial extent then that of said tube.

12. The adapter of claim 11 wherein each of said strengthening bars has a transverse forward wall located rearward of said externally splined intermediate section of said tube.

13. The adapter of claim 12 wherein said strengthening bars protrude radially outwards from said tube section.

14. The adapter of claim 13 wherein each of said strengthening bars has an outer elongated edge wall that angles inwards towards said tube section from said base plate.

15. The adapter of claim 14 wherein said transverse forward wall of said strengthening bar angles inwards towards said tube section from said outer elongated edge wall.

16. The adapter of claim 13 wherein each of said strengthening bars has a rear base wall continuous with said base plate.

17. The adapter of claim 16 wherein said rear base wall of each of said strengthening bars protrudes radially beyond at least a portion of said mounting holes through said base plate.

18. A knock-off type wheel hub for installation on an adapter attached to a disk brake hub or brake drum of a vehicle, said wheel hub having a body provided with a central bore of stepped diameter adapted to fit coaxially over said adapter, said hub having formed in the inner cylindrical wall surface of an intermediate longitudinal portion thereof a plurality of radially inwardly protruding, longitudinally disposed internal splines having in transverse section an arcuately curved shape, said splines alternating with a plurality of complementarily shaped, longitudinally disposed grooves adapted to longitudinally slidably receive external splines protruding radially outwards from said adapter.

19. The wheel hub of claim 18 wherein said body is further defined as having a concave dish-shaped base section and a tubular front section of smaller outer diameter than said base section.

20. The wheel of claim 19 wherein said base section of said body is further defined as having through the cylindrical wall thereof a plurality of spoke cylindrical holes spaced apart at regular circumferential intervals.

21. The wheel hub of claim 20 wherein said spoke holes are further defined as having at the inner entrance opening thereof a cup-shaped counterbore adapted to seat a ball-shaped enlargement at the end of a spoke.

22. The wheel hub of claim 21 wherein the outer cylindrical wall surface of said base section is further defined as tapering to a front diameter smaller than the rear diameter thereof.

23. The wheel hub of claim 22 wherein the axis of said spoke holes is inclined at an angle of about 12 degrees ±1 degree to a normal to the outer cylindrical wall surface of said base section.

24. The wheel hub of claim 23 wherein said spoke holes are further defined as having at the inner entrance opening thereof a cup-shaped counterbore adapted to seat a ball-shaped enlargement at the end of a spoke.

25. The wheel hub of claim 19 wherein said tubular front section of said body is further defined as having through the cylindrical wall thereof a plurality of cylindrical spoke holes spaced apart at regular circumferential intervals.

26. The wheel hub of claim 25 wherein said plurality of spoke holes is further defined as collectively lying on a first, outer circle proximate the front annular wall surface of said tubular front section, and on a second, inner circle at a longitudinal position intermediate said first circle and said base section, said holes said inner and outer circles being circumferentially staggered.

27. The wheel hub of claim 26 wherein the axis of said spoke holes on said inner circle is inclined at an angle of about 30 degrees ±1 degree with respect to a normal to the outer cylindrical wall surface of said tubular front section of said hub.

28. The wheel hub of claim 26 wherein the axis of said spoke holes on said outer circle is inclined at an angle of about 32 degrees ±1 degree to a normal to the outer cylindrical wall surface of said tubular front section of said hub.

29. In combination a wheel and adapter allowing the wheel to be fastened by means of a single knock-off type hub nut to disk brake hub or brake drum of a vehicle utilizing wheels of the type that are attached by a plurality of a lug bolts or lug nuts arranged in a circular pattern, said combination comprising;

a. an adapter including
    i. a circular base plate having through its thickness dimension a plurality of mounting holes adapted to register with lug bolt holes or studs of a disk brake hub or brake drum,
    ii. an elongated hollow tube integral and coaxial with said base plate, said tube protruding perpendicularly outwards from said base plate and having therethrough a central coaxial bore extending through said base plate, said bore having an inner or rear opening of sufficient size to fit over the wheel bearing cap of said disk brake hub or brake drum, said tube having on the exterior surface of an outer longitudinal portion thereof helical threads adapted to be threadingly engaged by internal threads of a hub nut,
    iii. a plurality of longitudinally disposed external splines protruding radially outwards from an externally splined intermediate section of said tube located between base plate and said outer longitudinal portion of said tube, said external splines having in transverse section a convex arcuate shape and being adapted to be longitudinally slidably received into registered complementarily shaped grooves formed in an internally splined surface in the inner longitudinal wall surface of a wheel hub, and
  b. a wheel including a hub having a circularly symmetric body including a concave dish-shaped base section and a tubular front section of smaller diameter than said base section, said hub having formed in the inner cylindrical wall surface of an intermediate longitudinal portion thereof a plurality of radially inwardly protruding, longitudinally disposed internal splines having in transverse section an arcuately curved shape, said splines alternating with a plurality of complementarily shaped, longitudinally disposed grooves adapted to longitudinally slidably receive said external splines protruding radially outwards from said adapter.

30. The combination of claim 29 wherein said tubular front section of said wheel is further defined as having a frusto-conically shaped inner bore that tapers axially inwardly to smaller diameter.

31. The combination of claim 30 further including a cup-shaped hub nut having a front polygonally-shaped section adapted to be engaged by a wrench, and a rear section having internal threads adapted to threadingly engage said external threads of said front tubular portion of said adapter, said rear section having a frusto-conically-shaped outer wall that tapers axially rearward to a smaller diameter, thereby adapting said outer wall of said rear section of said hub nut to exert a radially outwardly directed centering force on said inner wall surface of said wheel hub when said hub nut is tightened on said threaded tube section.

32. The combination of claim 31 wherein said rear section of said hub nut is further defined as having formed therein at least one axially disposed slot, thereby allowing said outer surface of said rear section to move radially outwards when said hub nut is tightened on said threaded tube section of said adapter.

33. The combination of claim 29 wherein said internally splined cylindrical wall surface of said hub is further defined as having in transverse section a generally sinusoidal shape.

* * * * *